United States Patent [19]

Sykora

[11] 3,839,814

[45] Oct. 8, 1974

[54] DEVICE FOR FISHING WITH A DEAD MINNOW

[76] Inventor: Bonifac Sykora, 278 Lisgar St., Toronto, Ontario, Canada M6J 3G1

[22] Filed: Mar. 19, 1973

[21] Appl. No.: 342,367

[30] Foreign Application Priority Data
Mar. 20, 1972 Canada .............................. 137481

[52] U.S. Cl. ............................................ 43/44.2
[51] Int. Cl. ........................................ A01k 83/06
[58] Field of Search .................... 43/44.2, 44.4, 44.8

[56] References Cited
UNITED STATES PATENTS
580,915 4/1897 Welch ................................. 43/44.2
2,562,605 7/1951 Embree et al. .................. 43/44.2 X Primary Examiner—Louis G. Mancene
Assistant Examiner—J. A. Oliff
Attorney, Agent, or Firm—Browdy & Neimark

[57] ABSTRACT

A bait frame for use with a dead minnow, the frame being three-sided, and having a gorge-engaging member of cylindrical shape affixed within said frame. The frame is disengageable at one point, and a dead minnow is affixed to the frame by inserting the gorge-engaging cylinder in the mouth of the minnow, and passing one side of the frame through the body of the minnow, and then re-engaging the frame. Hooks associated with the frame may be partially embedded in the body of the dead minnow, to further secure the body to the device. The gorge-engaging cylinder is of sufficient weight to eliminate the need to use a sinker. The apparatus results in a life-like bait when a minnow has been attached thereto.

8 Claims, 3 Drawing Figures

DEVICE FOR FISHING WITH A DEAD MINNOW

This invention relates to a device which facilitates the use of a dead minnow as a fishing bait.

It is an object of this invention to provide a frame to which a dead minnow may be affixed, whereby the minnow will have a life-like appearance, when it is used as a bait in trolling, or in casting.

A further object of the invention is to provide a device to which a dead minnow may be readily affixed, the device being provided with a plurality of hooks attached thereto.

A still further object of the invention is to provide a device to which a dead minnow may be affixed, and which is provided with an integral weight, thus eliminating the need for a separate weight or sinker.

A still further object of the invention is to provide a bait frame for use with a dead minnow comprising in combination: a three-sided wire frame of generally cigar-shaped configuration; a gorge-engaging member affixed at one of its ends centrally within said frame; said frame being separable at one point, whereby a portion of said frame may be inserted through a minnow and thence re-engaged; and at least one fish hook attached to said frame.

These and other objects of the invention will become apparent with reference to the attached drawings in which.

Detailed reference will now be made to the drawings wherein like reference numerals identify like parts.

Figure 1:
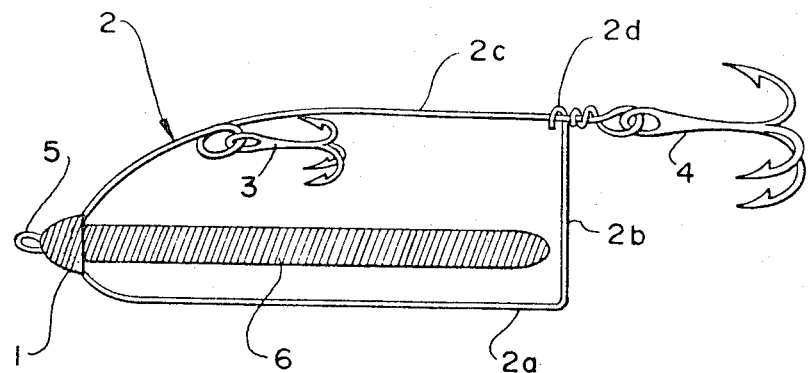
FIG. 1 is a side elevation of a frame according to the invention.
Figure 2:
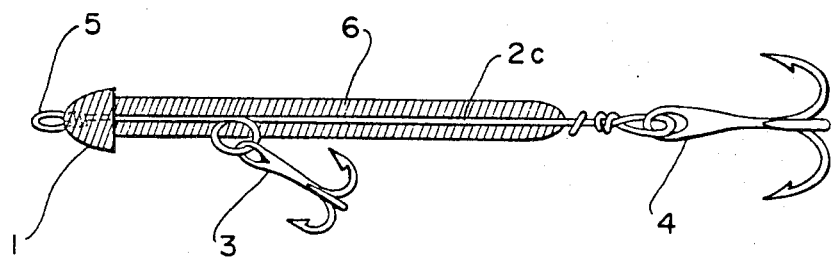
FIG. 2 is a top plan view of the device according to FIG. 1.

A frame of steel wire or the like is identified generally at 2, and is configured in an irregular cigar shape. Frame 2 comprises a flat bottom arm 2a, and an integral rear arm 2b at right angles thereto. Upper arm 2c curves forwardly and downwardly to join bottom arm 2a, at 1. Arms 2a and 2c are illustrated as being integral at 1, and are shown as forming an eye or ring 5, to which a fishing leader may be attached. Arm 2b terminates in a hook 2d, adapted to be releasably engaged on upper arm 2c.

A gorge-engaging member of generally cylindrical configuration, identified by reference numeral 6, is attached to frame 2, at 1, by molding or the like. Gorge-engaging member 6 may be made of lead or other heavy material, if a heavy lure is desired, thus avoiding the necessity for a separate sinker.

Multiple hooks 3 and 4 are illustrated, one attached to upper arm 2c, and one attached at the point of junction of upper arm 2c and rear arm 2b. It will be appreciated that one or other of these hooks may be employed, and both hooks are illustrated as a second alternative, only.

Figure 3:
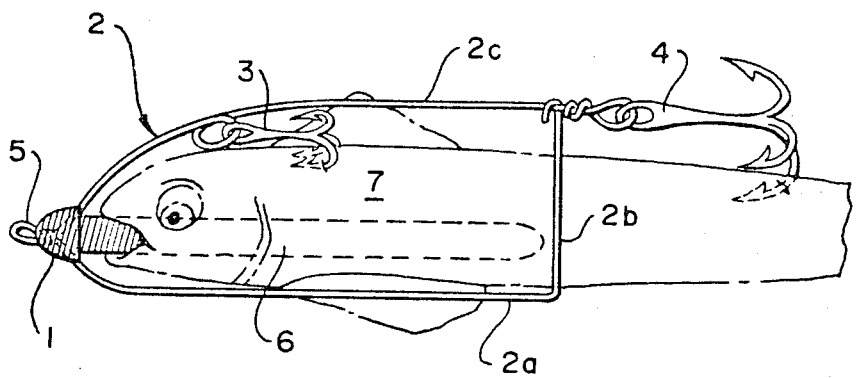
FIG. 3 is a side elevation according to FIG. 1, illustrating a minnow affixed thereto.

With reference to FIG. 3 a dead minnow 7 is shown engaged on and within frame 2. To prepare the frame for use, a minnow 7 is engaged on gorge-engaging member 6, while rear frame arm 2b is disengaged from upper arm 2c, and held below the body of the minnow. After gorge-engaging member 6 has been thrust into the minnow's throat, arm 2b is forced upwardly through the body of the minnow, until it can be hooked to arm 2c. Hooks 3 and 4 may then be partly pushed into the back of minnow 7.

In operation it has been found that a minnow may be readily engaged on the apparatus described above, and that when the apparatus is used in trolling, or in casting, that the dead minnow maintains life-like characteristics as it passes through water, thus effectively attracting fish. Further, when a fish strikes, the minnow is less likely to be lost without the attaching fish having been caught by either hook 3 or hook 4.

The foregoing is by way of example only and the invention should be limited only by the scope of the appended claims.

I claim:

1. A bait frame for use with a dead minnow comprising in combination:
    a three-sided wire frame of generally cigar-shaped configuration, having a horizontal bottom arm, a vertical rear arm and a top arm;
    a generally cylindrical gorge-engaging member being longitudinally affixed within said frame, nearer the bottom arm thereof than to the top arm thereof, said gorge-engaging member being affixed at its forward end to the pointed end of said cigar-shaped frame;
    said frame being separable at the point where the rear vertical arm thereof meets the upper arm thereof, whereby a portion of said frame may be inserted through a minnow and thence re-engaged;
    leader attaching means at the pointed end of said frame; and
    at least one fish hook attached to said frame.

2. A bait frame in accordance with claim 1 wherein said gorge-engaging member is made of a material heavy enough to act as a sinker.

3. A bait frame in accordance with claim 1 wherein said fish hook is attached to said top arm between the point where said top arm meets said bottom arm and the point where said top arm meets said rear arm.

4. A bait frame in accordance with claim 3 further including a second fish hook connected to said top arm at the rear of the frame.

5. A bait frame in accordance with claim 1 wherein said fish hook is connected to the rear of the frame.

6. A bait frame for use wih a dead minnow comprising in combination:
    a three-sided frame of steel wire having a substantially straight horizontal bottom arm, a curved top arm integral with a forward end of said bottom arm, and a substantially vertical arm integral with a rear end of said bottom arm, said substantially vertical arm being releasably engageable with said top curved arm;
    a gorge-engaging member of generally cylindrical configuration, a forward end of which is affixed to said frame at the point where said curved arm is integral with said bottom arm, said gorge-engaging member extending longitudinally within said frame;
    leader attaching means at the point where said curved arm is integral with said bottom arm; and
    at least one fish hook attached to said frame.

7. A bait frame according to claim 6, said vertical arm being adapted to be released from said top curved arm, while a minnow is being pushed onto said gorge-engaging member, and subsequently to pierce said minnow before re-engagement with said top curved arm, thus securing said minnow to said frame.

8. A bait frame in accordance with claim 6 wherein said gorge-engaging member is made of a material heavy enough to act as a sinker.

* * * * *